Nov. 25, 1924.

R. VARLEY

IGNITION GENERATOR

Filed July 1, 1920

INVENTOR
Richard Varley
BY
Rosenbaum Stockbridge & Borst
ATTORNEY

Nov. 25, 1924.

R. VARLEY 1,517,033

IGNITION GENERATOR

Filed July 1, 1920

INVENTOR
Richard Varley
BY
Rosenbaum Stockbridge & Borst
ATTORNEY

Nov. 25, 1924.
R. VARLEY
1,517,033
IGNITION GENERATOR
Filed July 1, 1920
4 Sheets-Sheet 3
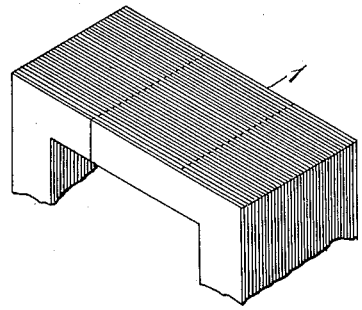
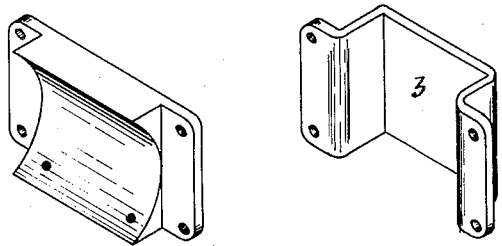
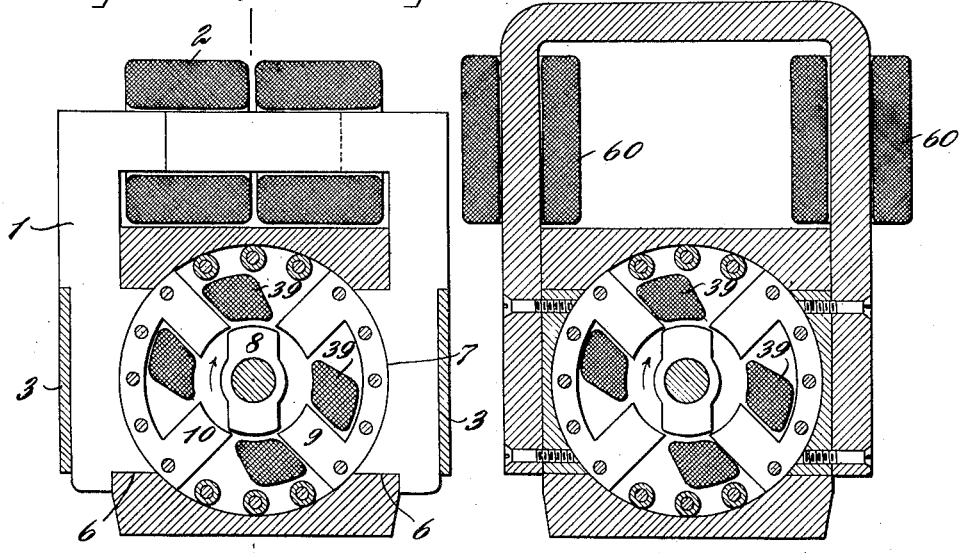
INVENTOR
Richard Varley
BY
Rosenbaum Stockbridge & Bost
ATTORNEY Patented Nov. 25, 1924.

1,517,033

UNITED STATES PATENT OFFICE.

RICHARD VARLEY, OF ENGLEWOOD, NEW JERSEY, ASSIGNOR TO VARLEY DUPLEX MAGNET COMPANY, A CORPORATION OF NEW JERSEY.

IGNITION GENERATOR.

Application filed July 1, 1920. Serial No. 393,243.

*To all whom it may concern:*

Be it known that I, RICHARD VARLEY, a citizen of the United States, residing at Englewood, in the county of Bergen and State of New Jersey, have invented certain new and useful Improvements in Ignition Generators, of which the following is a full, clear, and exact description.

This invention relates to ignition apparatus for explosion engines, the object being to provide a mechanically driven generator whose magnetic field is variable to suit the conditions under which the machine is operating; also to provide a generator in which the field magnetism is automatically controlled upon the actuation of any instrumentality to alter the speed of the engine. A further object is to provide means whereby a generator of the inductor type may be manually controlled to advance or retard the point in the cycle of operation where the peak of the current wave is developed, and a further object is to provide a construction of generator in which the usual "breaker" is associated or mounted in a manner to be easily inspected when the machine is connected with the engine. These and other objects are realized in the structure which will now be described in detail with reference to the accompanying drawings in which:

Fig. 7 is a vertical section of the machine taken at right angles to Fig. 1;

Fig. 8 is a similar view of a machine having a permanent field magnet; and

Figs. 9, 10, and 11 are details of the field magnet structure, and

Figure 12:
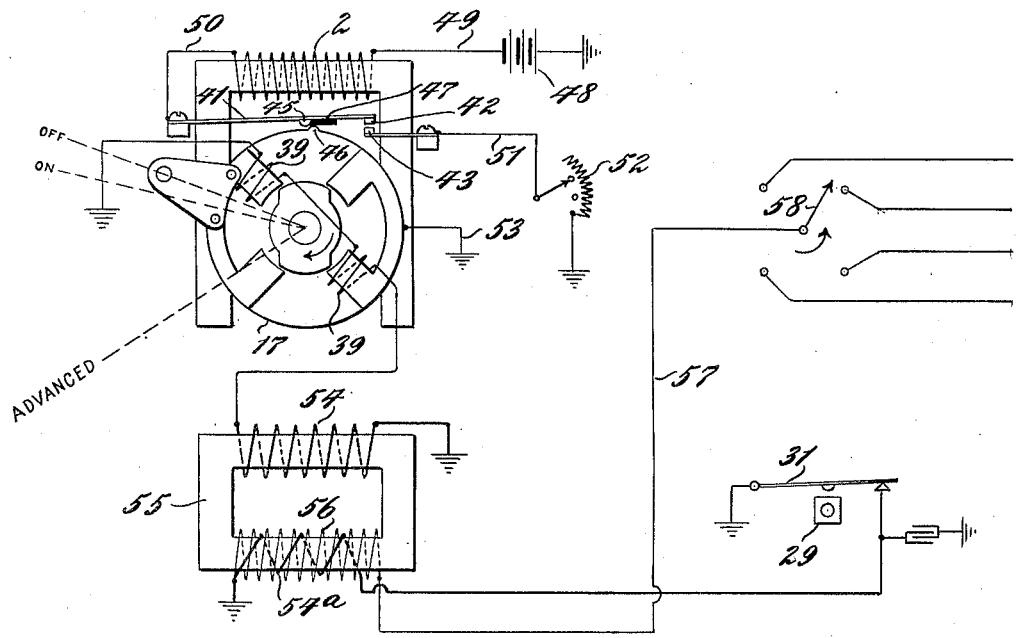

Fig. 12 is a diagram of the circuits.

Figure 2:
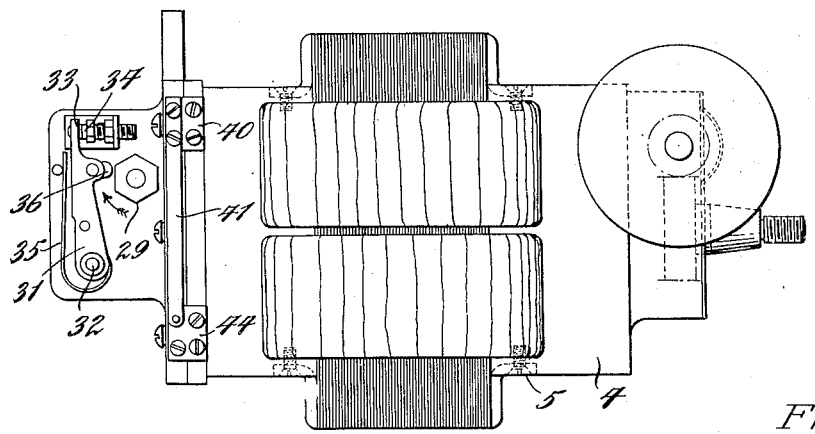
Fig. 2 is a plan of the same.
Figure 5:
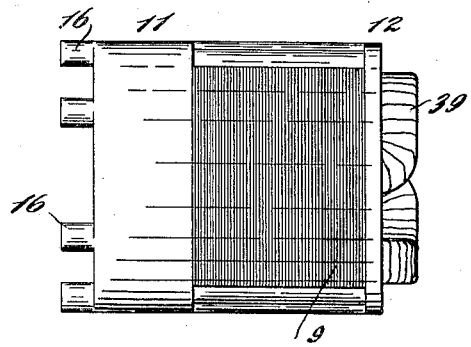
Fig. 5 is a side view of the shiftable pole structure.
Figure 6:
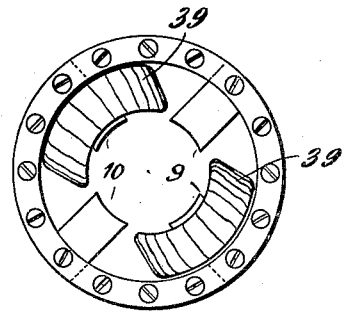
Fig. 6 is an end view of same.
Figure 3:
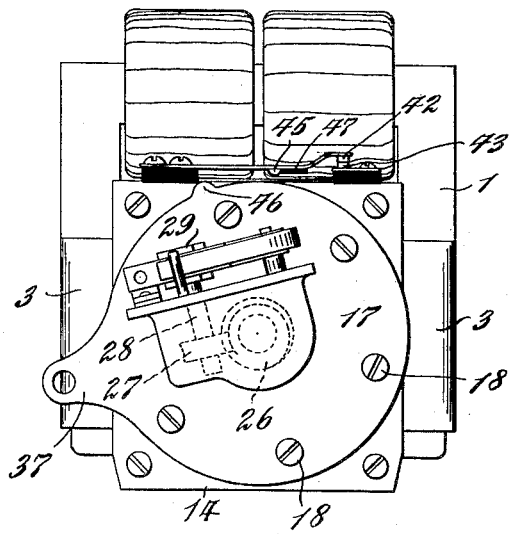
Fig. 3 is an end elevation.
Figure 4:
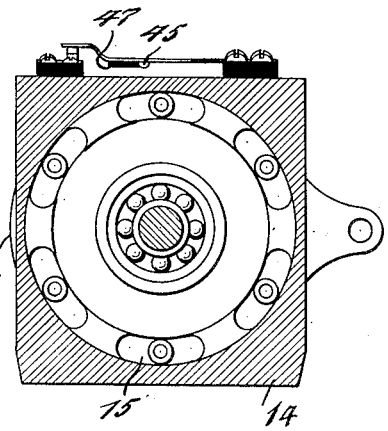
Fig. 4 is a section on line *y—y* of Fig. 1.

In the preferred embodiment of the machine, the field magnet instead of being of the usual permanent magnetic character is excited by a battery, and for this purpose the field magnet structure comprising the laminated core 1 carries upon its back yoke one or more energizing coils 2. The laminations of the core are held together by two brackets 3, 3 shown in detail in Fig. 10, which embrace respectively the polar ends of the laminations, the brackets being secured to the frame 4 of the machine by screws 5 as seen in Fig. 2. The frame of the machine is of an oblong rectangular shape exteriorly having openings 6 in opposite sides to admit the polar ends of the field magnet, the interior of the frame being shaped to form a cylindrical chamber, a portion of the wall of which is supplied by the curved faces 7 on the polar extremities of the magnet. This cylindrical space is occupied by the rotor 8 of the machine and the shifting pole structure shown in Figs. 5 and 6. The shifting pole structure consists of two sets of laminations 9 and 10 co-operating respectively with the polar ends of the field magnet. Each of these laminated structures is provided with two pole pieces connected by a back yoke whose outer surface is of the same curvature as the faces 7 of the polar ends of the field magnet, said surfaces having a bearing against each other which permits the shifting pole structure to turn slightly with respect to the stationary magnets. These two laminated structures are confined and supported between two end rings 11 and 12 in a manner to equally space the various pole pieces around the rotor or axis of the machine. The end rings 11 and 12 are clamped to the two laminated structures by the screws 13, Fig. 1, thus forming a unitary cylindrical structure, the exterior surface of which bears against the inner surface of the cylindrical chamber in the casing 4. The front end of the casing 4 is closed by a plate 14 having a series of slots 15 arranged in a circle near its outer edge and in line with the ring 11 on the shifting structure described. The ring 11 is provided with integral lugs 16 which respectively enter the slots 15. Outside of the end plate 14 is a cover plate and housing 17 which rests against the said plate 14 and which carries a number of screws 18 near its periphery which enter the lugs 16 on the ring 11, and thus secure the shifting structure to the cover plate and housing 17 so that by rocking the housing the shifting structure may be moved on its axis a distance determined by the length of the slots 15.

Figure 1:
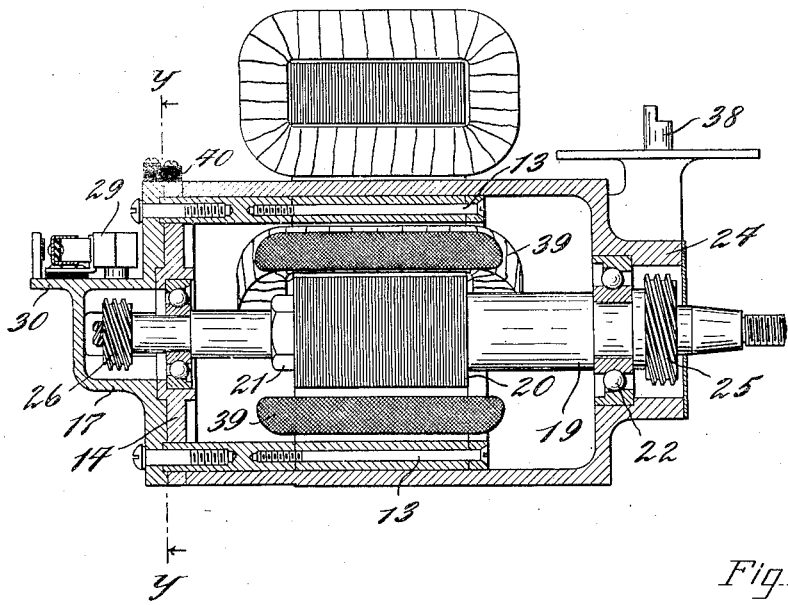
Fig. 1 is a vertical central section of my improved machine.

The rotor 8 is composed of laminations mounted upon a shaft 19 and confined between a shoulder 20 on said shaft and a nut 21. This rotor is provided with two polar extensions with curved faces presented to the pole pieces of the shifting structure. The shaft 19 is mounted in suitable ball bearings 22 and 23, the latter being in the plate 14 and the former being in a permanent end closure 24 of the frame 4. The shaft projects at each end beyond its bearings and carries the worms 25 and 26. The worm 26 is within the housing 17 and engages a worm gear 27 on a short upright shaft 28 which projects through the wall of the housing and carries a cam 29 on its outer end. This cam is exposed upon a substantially horizontal plate or shelf 30 above the shaft 19 and which forms a part of the housing 17. Associated with the cam 29 is a breaker arm 31 pivoted upon the shelf 30 at 32 and carrying a contact 33 which is normally impelled against a corresponding fixed contact 34 by a spring 35. The arm 31 carries a fibre piece 36 which is presented towards the cam shoulders of the cam 29. This is a usual construction of breaker mechanism but its mounting differs from that of other breakers in that instead of being arranged on a disk or plate concentric with the end of the shaft, it is placed horizontally above the same and can be seen by looking downward instead of looking laterally towards the end of the shaft, which is regarded as a distinct advantage over the prior structures. It will be seen that the housing 17 in oscillating on its axis carries with it the breaker mechanism described so that the shifting structure 9 and 10 and the breaker mechanism move together. For imparting this motion the plate 17 is provided with a lug 37 for the attachment of connections by which the movable portions referred to can be shifted by hand. The worm 25 at the opposite end of the shaft 19 is supposed to drive the distributor, one of the shafts 38 of which is shown in Fig. 1, but as no novelty is claimed in connection with this device a further description is unnecessary.

Mounted upon the upper edge of the plate 14 by means of insulating block 40 is a spring strip 41 which lies in the plane of the periphery of the housing plate 17, the block 40 overhanging to thus locate the strip. This strip carries at its free end a contact point 42 which co-acts with a contact 43 mounted upon another insulating block 44. On the under face of the strip it is provided with a lug 45 which stands in the path of a cam 46 formed upon the periphery of the housing plate 17. Spring 41 is also provided with a plate of insulating material 47 on its under face immediately adjoining one side of the lug 45. In the movements of the housing plate 17 the lug 46 is adapted to engage the lug 45 and lift the spring so as to separate the contacts 42 and 43. This engagement of the lugs also establishes a circuit between the spring and the housing plate which is open either when lug 46 is in contact with the insulating plate 47 or wholly out of engagement with the spring, for a purpose which will appear in the description of the operation.

In the ordinary inductor type of generator an alternating current is generated in coils which are placed upon the pole pieces of the stationary magnet, but inasmuch as I desire to use a shifting magnetic structure interposed between the rotor and the stationary magnet to maintain the wave peak coincident with the opening of the breaker points when "advancing" and "retarding" the spark, I have provided for such use by mounting the coils in which the alternating currents are generated upon the poles of the said shifting structure.

The preferable arrangement for such coils is indicated at 39 there being one coil for each structure 9 and 10 one of these being placed upon one pole piece of the structure diametrically opposite the pole piece of the companion structure upon which the other coil is placed. Four coils, i. e., one on each pole can be used, if desired, the said four coils being connected in series in a suitable manner so that their voltages will be added. The pole faces of the rotor 8 are of a width to slightly more than bridge the space between adjoining poles of the shifting structure. Referring now to Fig. 12, it will be understood that the two pole pieces of each of the structures 9 and 10 have the same polarity as the polar end of the field magnet with which they are respectively associated. In accordance with the usual operation of inductor generators, the rotation of the rotor 8 will cause a current to be induced in the coils 39 while the said rotor is passing the two opposing pole pieces of the shifting structure containing the coils 39. The voltage will reach its peak at or about the instant when the rotor passes out of the field of one pair of poles and into the field of the other pair, i. e., when the magnetic flux shifts from the legs under the coils 39 to the others or the unwound legs. With this general operation in mind, it will be seen that since the shifting structure 9—10 is capable of limited rotary motion or adjustment upon its axis, the angular positions at which the voltage peaks are obtained can be adjusted either forward or backward with respect to the direction of rotation of the rotor. In Fig. 12, the generator is shown in combination with a transformer which is adapted to increase the voltage of the current waves induced in the generator and thereby perform the functions of the usual secondary windings which are generally incorporated in magnetos. The battery which energizes the field coil 2 is indicated by 48 and the circuit of this battery which is grounded on one side is by wire 49 to the coil 2, wire 50, spring arm 41, and thence to ground by either of two paths, one being by the contacts 42, 43, wire 51 and resistance 52 while the other being through the housing plate 17 to ground, the actual course of the current depending upon the position of the lugs 45, 46, with respect to each other at any given time. It is well understood that for starting an explosion engine, especially when cold, a more intense spark is necessary than when the engine is running and therefore a device that will afford the necessary currents of different intensity at the proper times respectively will effect economy in operation and less wear due to overheating of delicate parts. In starting an engine with this apparatus the housing plate 17 is moved by hand so as to bring the two lugs 45 and 46 together, allowing the full current of battery 48 to energize the field magnet of the generator, the current grounding at 53 instead of going to ground through the resistance 52. The engine may be allowed to run with this hot spark as long as the conditions require, but usually after a short interval a lesser spark intensity is required and it is obtained by a slight advance of the spark which is accomplished by rotating the housing plate 17. This carries the lug 46 out of contact with the lug 45 and the contacts 42 and 43 are closed, thus cutting off the short circuit 53 and establishing a circuit for the battery through the resistance 52. This resistance cuts down the current flowing in the coils 2 to any predetermined extent depending upon the adjustment of the resistance but which may always be to a point where the running of the engine will best suit the operator. When the engine is to be stopped the housing plate 17 is moved in the opposite direction to the extreme "retard" position at which point the lug 46 passes beyond the lug 45 and rests upon the insulating plate 47 in which position both paths of the battery current to ground are cut off, the ignition current ceases and the engine stops.

The current impulses which are generated in the coils 39 are passed through the primary winding 54 of a transformer to ground, the core of the transformer being indicated by 55. One end of the winding 54ª on the opposite leg is grounded, the other end being connected to the breaker actuated by the cam 29 and then to ground; the high tension impulse induced in the secondary 56 of the transformer is directed by wire 57 to the flier 58 of a distributor which in the well known way distributes the current to the spark plugs or other firing device of the engine.

Obviously the shifting pole structure may be embodied in a magneto as shown in Fig. 8, the solid field magnet being of the usual permanent variety but by preference being equipped with coils 60 by which occasionally a charging current may be applied to the magnets.

I claim:

1. A mechanically driven generator for supplying ignition currents, in combination with common, means for simultaneously adjusting its field magnetism and altering the point in the cycle of operation where the peak of the current wave is developed.

2. A mechanically driven generator having a field coil in combination with a battery, a resistance normally in the circuit of the field coil, a circuit maker and breaker controlling the circuit from said generator, means for advancing or retarding the instant of closing and opening of the circuit maker and breaker with respect to the rotation of the generator, and means for automatically shunting the resistance in the field coil circuit whenever the instant of closing and opening of the circuit maker and breaker is retarded to a given extent.

3. A mechanically driven generator for supplying ignition currents to an explosion engine, a spark advancing and retarding device, a battery for energizing the field magnet of the generator, and a circuit opener for the battery actuated by the said device.

4. A mechanically driven generator for ignition currents, a manually controlled timing device operable in accordance with the speed of the engine and means whereby the field magnetism of the generator will be altered when said device is actuated.

5. A mechanically driven generator comprising shiftable magnetic pole pieces, an electro-magnetic field magnet, a battery adapted to energize said field magnet and a resistance adapted to be thrown into and out of circuit with the battery by the movement of said pole pieces.

6. In a mechanically driven generator for ignition circuits, the combination of a U-shaped stationary magnetic field member, a rotor mounted for rotation between the polar ends of the U-shaped member, a shifting polar element interposed between the rotor and the polar ends of the member, and shiftable about the axis of the rotor, said element having four pole pieces extending toward the rotor and magnetically connected in pairs, one pair for each pole of the field member, and a coil upon one of the pole pieces of each pair in which currents are induced by the rotation of the rotor, the shifting of the polar element and pole pieces altering the point in the cycle of operation where the peak of the current wave is developed.

7. In a mechanically driven generator for ignition purposes having a rotor, the combination of a controlling member shiftable about the axis of the rotor, means controlled by said member for varying the points in the rotation of the rotor at which the peak of the currents are generated, a shaft rotatably carried by the member and geared to the rotor to be driven thereby in all angular positions of the member about the rotor, said shaft being offset from and at right angles to the axis of the rotor, a timing cam carried by one end of the shaft, and circuit making and breaking means carried by the member in a plane transverse to the shaft and cooperating with the cam, whereby the cam and cooperating circuit making and breaking means may be disposed above and oscillated about the axis of the rotor and be varied correspondingly with variations in the points of the cycle where the peak of the currents are generated.

8. In a mechanically driven generator for ignition purposes having a rotor and field coil, the combination of a controlling member shiftable about the axis of the rotor, a shaft rotatably carried by the member and geared to the rotor to be driven thereby in all angular positions of the member about the rotor, said shaft being offset from and at right angles to the axis of the rotor, a timing cam carried by one end of the shaft, circuit making and breaking means carried by the member in a plane transverse to the shaft and cooperating with the cam, whereby the cam and cooperating circuit making and breaking means may be disposed above and oscillated about the axis of the rotor, a resistance, and means also controlled by the controlling member for varying the strength of the field coil by inserting the resistance in series with the field coil when the member is away from one angular position.

9. In a mechanically driven generator for ignition purposes having a rotor, the combination of a controlling member shiftable about the axis of the rotor, a shaft rotatably carried by the member and geared to the rotor to be driven thereby in all angular positions of the member about the rotor, said shaft being offset from and at right angles to the axis of the rotor, a timing cam carried by one end of the shaft, and circuit making and breaking means carried by the member in a plane transverse to the shaft and cooperating with the cam, whereby the cam and cooperating circuit making and breaking means may be disposed above and oscillated about the axis of the rotor, an electromagnetic field magnet, a battery adapted to energize the magnet, a resistance normally in circuit with said magnet and battery, and means including a switch operated by said member, when the timing cam and cooperating circuit making and breaking means are shifted to retard the spark to a given extent, for shunting said resistance.

In witness whereof, I hereunto subscribe my signature.

RICHARD VARLEY.